US012463370B2

(12) United States Patent
Allaway et al.

(10) Patent No.: US 12,463,370 B2
(45) Date of Patent: Nov. 4, 2025

(54) PIVOTABLE CONNECTOR

(71) Applicant: Microsoft Technology Licensing, LLC, Redmond, WA (US)

(72) Inventors: David Scott Allaway, Bothell, WA (US); Gianna Marie Morena, Cranston, RI (US); Minh Cao Nguyen, Bothell, WA (US); Suet Fong Tin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 530 days.

(21) Appl. No.: 17/931,039

(22) Filed: Sep. 9, 2022

(65) Prior Publication Data

US 2024/0088598 A1 Mar. 14, 2024

(51) Int. Cl.

| | |
|---|---|
| ***H01R 13/502*** | (2006.01) |
| ***H01R 13/62*** | (2006.01) |
| ***H01R 35/04*** | (2006.01) |
| *H01R 13/627* | (2006.01) |

(52) U.S. Cl.

CPC ....... *H01R 13/502* (2013.01); *H01R 13/6205* (2013.01); *H01R 35/04* (2013.01); *H01R 13/6278* (2013.01); *H01R 2201/06* (2013.01)

(58) Field of Classification Search

CPC .............. H01R 13/502; H01R 13/6505; H01R 13/6278; H01R 35/04; H01R 2201/06

USPC ............................................................ 439/39

See application file for complete search history.

(56) References Cited

U.S. PATENT DOCUMENTS

| | | | | |
|---|---|---|---|---|
| 2,652,546 A * | 9/1953 | Christner | H01R 35/04 | 439/651 |
| 6,786,743 B2 * | 9/2004 | Huang | H01R 35/02 | 439/31 |
| 6,991,467 B1 * | 1/2006 | Cheng | H01R 31/06 | 439/640 |
| 7,128,615 B1 * | 10/2006 | Liao | H01R 35/04 | 439/640 |

(Continued)

FOREIGN PATENT DOCUMENTS

| | | | |
|---|---|---|---|
| CN | 201156604 Y | 11/2008 | |
| CN | 213071654 U * | 4/2021 | |
| WO | WO-2020113508 A1 * | 6/2020 | H01R 12/91 |

OTHER PUBLICATIONS

"International Search Report and Written Opinion issued in PCT Application No. PCT/US23/027972", Mailed Date: Oct. 19, 2023, 12 Pages.

(Continued)

*Primary Examiner* — Peter G Leigh

(74) *Attorney, Agent, or Firm* — Alleman Hall & Tuttle LLP

(57) ABSTRACT

A connector for an electronic device is disclosed. The connector includes a housing. The housing includes a leading surface. The leading surface forms a plug opening and a fulcrum spaced away from the plug opening. The connector includes an electronic plug extending through the plug opening away from the leading surface of the housing. The connector includes a pivot providing the electronic plug a range of angular adjustment relative to the leading surface of the housing. The connector includes a bias mechanism biasing the electronic plug to a default position within the range of angular adjustment.

20 Claims, 8 Drawing Sheets

(56) References Cited

U.S. PATENT DOCUMENTS

| | | | | |
|---|---|---|---|---|
| 8,157,569 | B1 * | 4/2012 | Liu | H01R 35/04 439/11 |
| 10,063,021 | B1 * | 8/2018 | Lipke | H01R 13/719 |
| 2005/0112908 | A1 | 5/2005 | Yueh | |
| 2005/0112939 | A1 * | 5/2005 | Grzegorzewska | G02B 6/4277 439/534 |
| 2013/0217248 | A1 | 8/2013 | Stevens et al. | |
| 2014/0127937 | A1 * | 5/2014 | Huang | H01R 35/04 439/534 |
| 2014/0273546 | A1 * | 9/2014 | Harmon | H01R 13/6205 439/39 |
| 2015/0072539 | A1 | 3/2015 | Xie | |
| 2019/0345974 | A1 * | 11/2019 | Grziwok | F16M 11/14 |
| 2020/0169035 | A1 * | 5/2020 | Rohrbach | H01R 13/6205 |
| 2021/0194194 | A1 * | 6/2021 | Piotrowski | H01R 13/633 |
| 2022/0247192 | A1 * | 8/2022 | Martin | H02J 7/0044 |

OTHER PUBLICATIONS

"360 Degree Rotation 1m Weave Style 8 Pin to USB 2.0 Strong Magnetic Charger", Retrieved from: https://www.fruugoindia.com/360-degree-rotation-1m-weave-style-8-pin-to-usb-20-strong-magnetic-charger-cable-with-led-indicator-for-iphone-x-iphone-8-amp-8-plus-iphone-7-amp-7/p-53087766-107025815?language=en, Retrieved Date: May 11, 2021, 3 Pages.

* cited by examiner

PIVOTABLE CONNECTOR

BACKGROUND

A connector is removably affixable to an electronic device to provide an electrical connection between the electronic device and an external electrical source. The electrical connection is established upon insertion of the electronic plug into a plug receptacle of the electronic device. Likewise, the electrical connection is severed upon removal of the electronic plug from the plug receptacle of the electronic device.

SUMMARY

Examples are disclosed that relate to a pivotable connector having features that promote low-friction engagement between an electronic plug of the connector and a plug receptacle of an electronic device that allows for easy removal of the electronic plug from the plug receptacle. In one example, a connector includes a housing. The housing includes a leading surface. The leading surface forms a plug opening and a fulcrum spaced away from the plug opening. The connector includes an electronic plug extending through the plug opening away from the leading surface of the housing. The connector includes a pivot providing the electronic plug a range of angular adjustment relative to the leading surface of the housing. The connector includes a bias mechanism biasing the electronic plug to a default position within the range of angular adjustment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
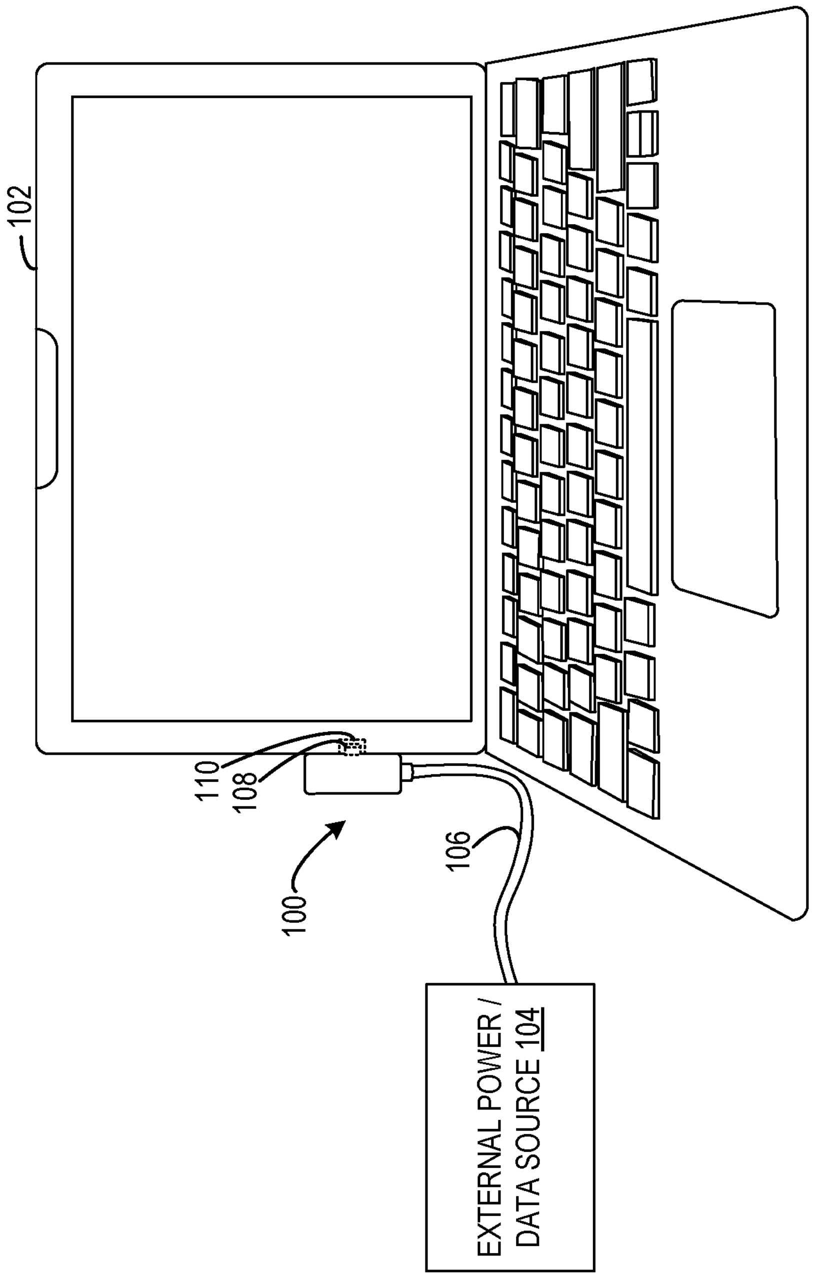
FIG. 1 shows an example pivotable connector removably affixed to an electronic device.

In a scenario where an electronic plug is pulled out of the plug receptacle with an off-axis force and/or a rotational pulling motion—i.e., not pulled straight out, friction caused by interference between the electronic plug and the plug receptacle is increased relative to a scenario where the electronic plug is pulled straight out of the plug receptacle. This is due to the electronic plug having a fixed orientation relative to the connector. Such increased friction causes binding between the electronic plug and the plug receptacle that makes removal of the electronic plug from the plug receptacle more difficult. In some cases, binding may cause the attempted removal of the plug to result in undesirably moving the entire electronic device. Moreover, repeated removal of the electronic plug from the plug receptacle with an off-axis force and/or a rotational pulling motion can cause degradation of the electronic plug and/or the plug receptacle.

Accordingly, the present disclosure is directed to a pivotable connector having features that promote low-friction engagement between an electronic plug of the connector and a plug receptacle of an electronic device that allows for easy removal of the electronic plug from the plug receptacle. In one example, a connector includes a pivot providing an electronic plug a range of angular adjustment. When the electronic plug of the connector is pulled out of a plug receptacle of an electronic device with an off-axis force and/or a rotational pulling motion, the electronic plug pivots within the range of angular adjustment to maintain alignment with the plug receptacle as the electronic plug pulls away from the plug receptacle and the housing of the connector leverages against a fulcrum of the housing.

The fulcrum and the pivotable electronic plug of the connector collectively provide the technical benefit of reducing friction and/or binding between the electronic plug and the plug receptacle upon removal of the electronic plug from the plug receptacle. In other words, the ability of the electronic plug to angular adjust or pivot relative to the housing provides the technical benefit of allowing the electronic plug to be removed from a plug receptacle with less force than another connector that has an electronic plug with a fixed orientation relative to a housing of the connector. Additionally, a bias mechanism biases the electronic plug to a default position that facilitates alignment with a plug receptable when the electronic plug is inserted into the plug receptacle. The bias mechanism provides the technical benefit of reducing friction and/or misalignment between the electronic plug and the plug receptacle. Moreover, each of the above-described features provide the technical benefit of reducing or eliminating unwanted pulling of the electronic device responsive to plug removal and reducing degradation of the connector upon repeated insertion and removal of the electronic plug into/out of various plug receptacles. Further, in some examples, the connector includes additional features that promote low-friction engagement between the electronic plug and a plug receptacle of an electronic device as will be discussed in further detail below.

FIG. 1 shows an example pivotable connector 100 removably affixed to a laptop computer 102 to form an electrical connection between the laptop computer 102 and an external electrical power/data source 104 via a cable 106. In particular, the pivotable connector 100 includes an electronic plug 108 that is inserted into a plug receptacle 110 of the laptop computer 102 to establish the electrical connection. The electronic plug 108 is pivotable within a range of angular adjustment relative to the pivotable connector 100 to maintain alignment with the plug receptacle 110 when the electronic plug is pulled out of the plug receptacle with an off-axis force and/or a rotational pulling motion. Such pivoting of the electronic plug 108 reduces friction between the electronic plug 108 and the plug receptacle 110 that allows for the electronic plug 108 to be easily removed from the plug receptacle 110.

The pivotable connector 100 enables the transmission of electrical power between the external electrical power/data source 104 and the laptop computer 102 via the electrical connection. In some examples, the pivotable connector 100 enables the transmission of data between the external electrical power/data source 104 and the laptop computer 102 via the electrical connection. In some examples, the pivotable connector 100 enables the transmission of both electrical power and data between the external electrical power/data source 104 and the laptop computer 102. In some examples, the pivotable connector 100 is compatible with a USB-C type plug receptable of an electronic device such as the laptop computer 102.

The external electrical power/data source 104 can take any suitable form. In some examples, the external electrical power/data source 104 is an electrical power source, such as an electrical power socket. In some examples, the external electrical power/data source 104 is an electrical power storage device, such as a battery. In some examples, the external electrical power/data source 104 is an external data storage device, such as a solid-state drive (SSD). In some examples, the external electrical power/data source 104 is another electronic device, such as another computer or computer peripheral.

The laptop computer 102 is provided as a non-limiting example of an electronic device to which the pivotable connector 100 is removably affixable in order to establish an electrical connection with an external electrical power/data source. The pivotable connector 100 is removably affixable to any suitable electronic device having a plug receptacle that is compatible with the electronic plug of the pivotable connector 100. In the illustrated example, the pivotable connector 100 provides a wired electrical connection between the laptop computer 102 and the external electrical power/data source 104. In other examples, the pivotable connector 100 provides a wireless connection between an electronic device and an external electrical power/data source. For example, the pivotable connector may include a wireless transceiver (e.g., WIFI®, Bluetooth®) dongle that establishes a wireless connection between an electronic device and another external electronic device.

Figure 2:
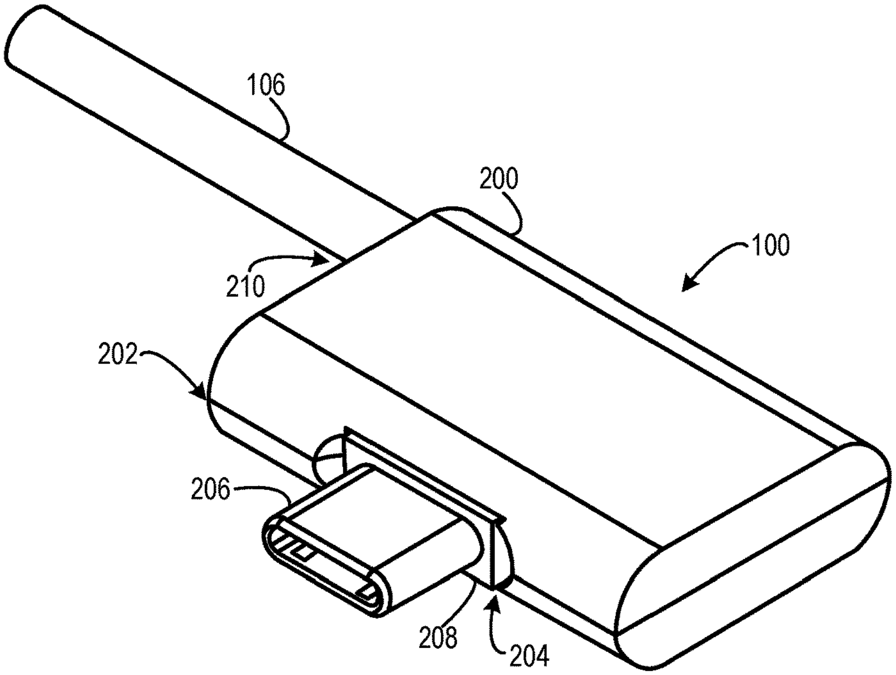
FIGS. 2-4 show different views of an example pivotable connector.
Figure 3:
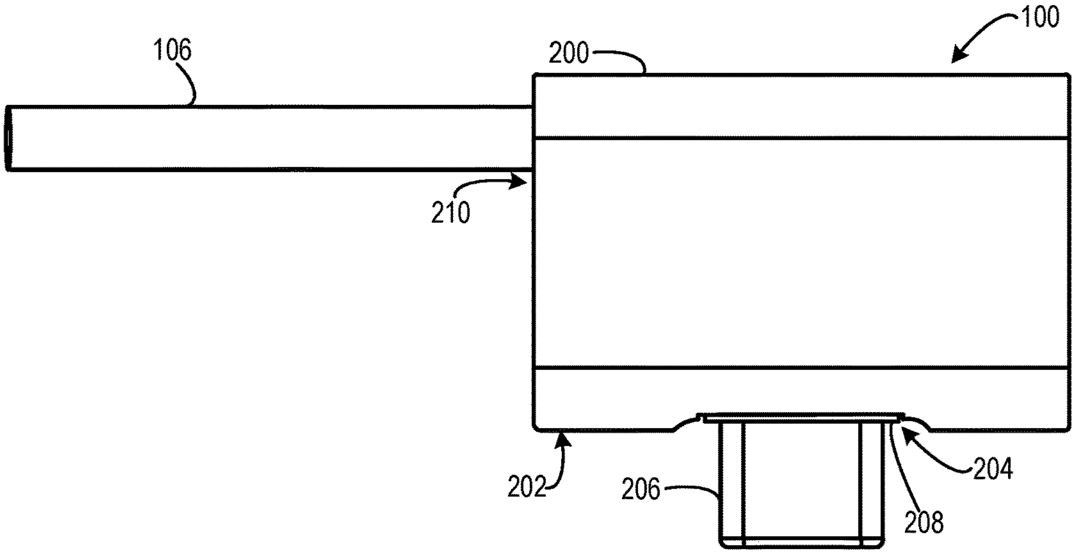
Figure 4:
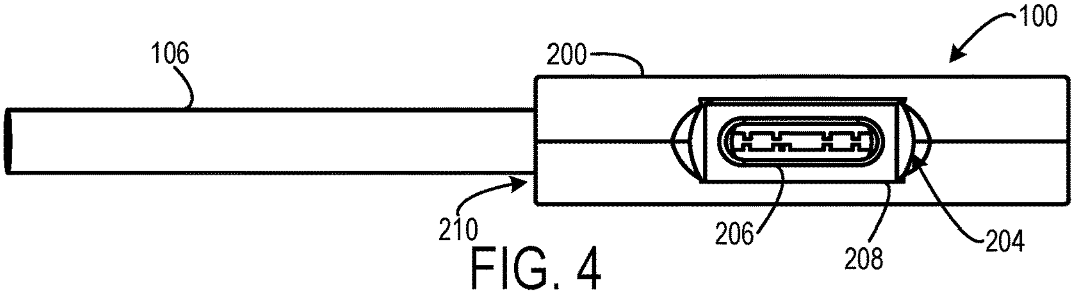

FIGS. 2-4 show different views of the pivotable connector 100 shown in FIG. 1. FIG. 2 shows a perspective view of the pivotable connector 100. FIG. 3 shows a top view of the pivotable connector 100. FIG. 4 shows a front view of the pivotable connector 100. These and other drawings may omit some parts/features of the connector in order to make more relevant parts/features easier to appreciate. The pivotable connector 100 includes a housing 200 including a leading surface 202 that interfaces with a corresponding surface of an electronic device (e.g., an electronic device 1000 shown in FIG. 10) when the pivotable connector 100 is removably affixed to the electronic device. The leading surface 202 of the housing 200 forms a plug opening 204. An electronic plug 206 extends through the plug opening 204 away from the leading surface 202 of the housing 200. For example, the electronic plug 206 is representative of the electronic plug 108 shown in FIG. 1. An internal retention structure 208 is coupled to the electronic plug 206. The internal retention structure 208 is at least partially contained within the housing 200 and pivotably couples the electronic plug 206 to the housing 200, such that the electronic plug 206 has a range of angular adjustment relative to the leading surface 202 of the housing 200.

The housing 200 further forms a cable opening 210. The cable 106 extends through the cable opening 210 away from the housing 200. The cable 106 is electrically connectable to an external electrical power/data source to enable transmission of electrical power and/or data between the external electrical power/data source and the electronic device.

In the illustrated example, the housing 200 is formed from over-molded plastic (e.g., ABS). In other examples, the housing 200 is formed from/by one or more different material(s) and/or different manufacturing process(es). The housing 200 may be formed from any suitable material, manufactured using any suitable manufacturing process into a connector having any desired shape and/or configuration.

In the illustrated example, the electronic plug 206 is a USB-C compatible electronic plug that is configured to plug into a corresponding USB-C type plug receptacle of an electronic device. As such, the plug is reversible in that it may be plugged in either of two orientations. In other examples, the electronic plug is a different type of electronic plug (e.g., USB-A, USB 2.0B, USB 3.0B, USB 2.0 Micro, USB 3.0 Micro, USB Mini 5, Lighting, HDMI). The electronic plug may be any suitable type of plug that is configured to plug into a receptacle of an electronic device.

Figure 5:
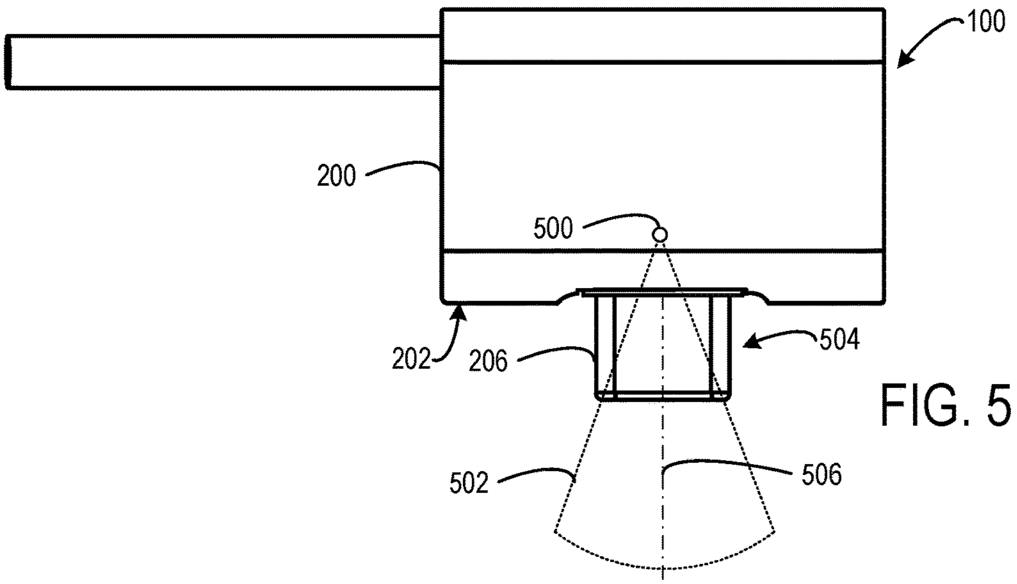
FIG. 5 shows a pivotable connector including an electronic plug in a default position within a range of angular adjustment.
Figure 6:
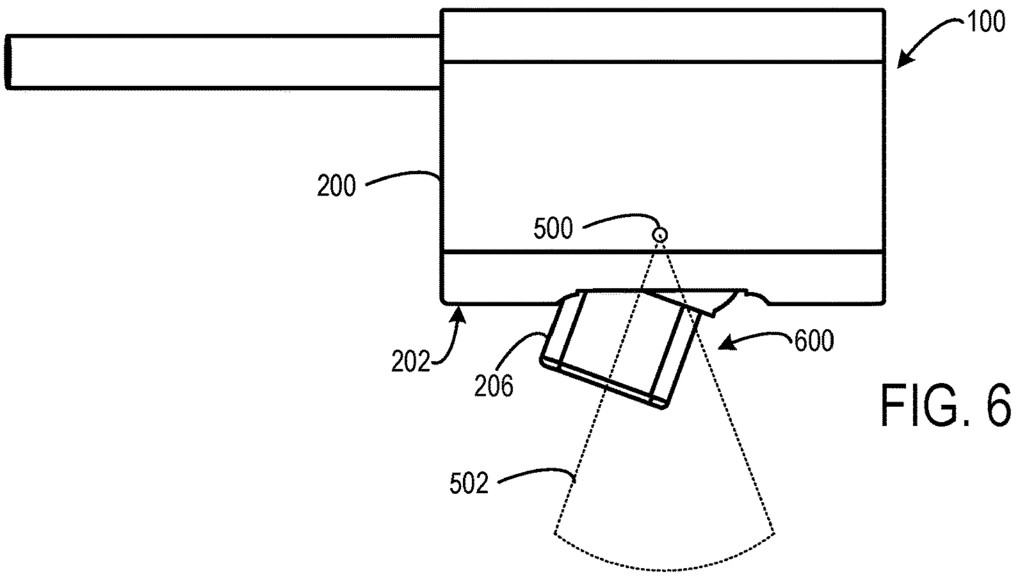
FIG. 6 shows a pivotable connector including an electronic plug pivoted to a left-most position within a range of angular adjustment.
Figure 7:
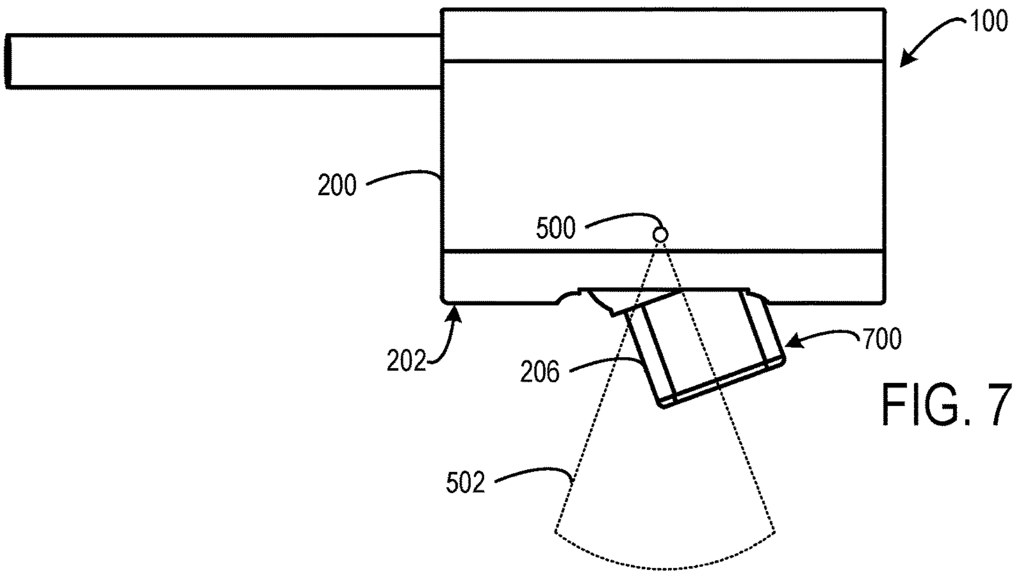
FIG. 7 shows a pivotable connector including an electronic plug pivoted to a right-most position within a range of angular adjustment.

As shown in FIGS. 5-7, the pivotable connector 100 includes a pivot 500 that provides the electronic plug 206 a range of angular adjustment 502 relative to the leading surface 202 of the housing 200. The electronic plug 206 pivots within the range of angular adjustment 502 to allow for low friction disengagement of the electronic plug 206 with a plug receptacle of an electronic device. Such low friction disengagement enables the electronic plug 206 to be easily removed from the plug receptacle of the electronic device when the electronic plug 206 is pulled out of the plug receptacle with an off-axis force and/or a rotational pulling motion. Note that such features also allow for the electronic plug 206 to be easily removed from the plug receptacle of the electronic device when the electronic plug 206 is pulled out of the plug receptacle with on-axis motion.

In FIG. 5, the electronic plug 206 is in a default position 504 relative to the leading surface 202 of the housing 200. In the default position, a central axis 506 of the electronic plug 206 is perpendicular to the leading surface 202 of the housing 200 and the electronic plug 206 is centered in the range of angular adjustment 502. In the default position, the electronic plug 206 is positioned perpendicular relative to the leading surface 202 of the housing 200, such that mating features of the electronic plug 206 align with corresponding mating features of a plug receptacle of an electronic device to allow for insertion of the electronic plug 206 into the plug receptacle. For example, such mating features include complimentary shapes of the electronic plug and the plug receptacle as well as pins in the electronic plug and pin contacts in the plug receptacle.

In FIG. 6, the electronic plug 206 is pivoted to a left-most position 600 within the range of angular adjustment 502 relative to the leading surface 202 of the housing 200. The electronic plug 206 is pivoted to the left-most position 600 in a scenario where the electronic plug 206 is pulled out of a plug receptacle with an off-axis force that causes the right side of the pivotable connector 100 to be pulled away from the plug receptacle and the left side of the pivotable connector 100 to act as a fulcrum that is leveraged against a surface of the electronic device. As used herein, relative directional terms such as "left" and "right," "upper" and "lower," "top" and bottom" are used based on the perspective of the drawings and are in no way limiting.

In FIG. 7, the electronic plug 206 is pivoted to a right-most position 700 within the range of angular adjustment 502 relative to the leading surface 202 of the housing 200. The electronic plug 206 is pivoted to the right-most position 700 in a scenario where the electronic plug 206 is pulled out of a plug receptacle with an off-axis force that causes a left side of the pivotable connector 100 to be pulled away from the plug receptacle and a right side of the pivotable connector 100 to act as a fulcrum that is leveraged against a surface of the electronic device.

The positions of the electronic plug 206 in FIGS. 5-7 are provided as non-limiting examples. Note that the pivot 500 enables the electronic plug 206 to pivot to any suitable angular position within the range of angular adjustment 502. In the illustrated example, the pivot 500 provides the electronic plug 206 with a range of angular adjustment of approximately +/−25 degrees. The pivot may be configured to allow for any suitable range of angular adjustment of the electronic plug. While the range is symmetrical in the illustrated example, this is not required. For example, the plug may have more pivoting travel to the left of a default position than to the right, or vice versa.

Figure 8:
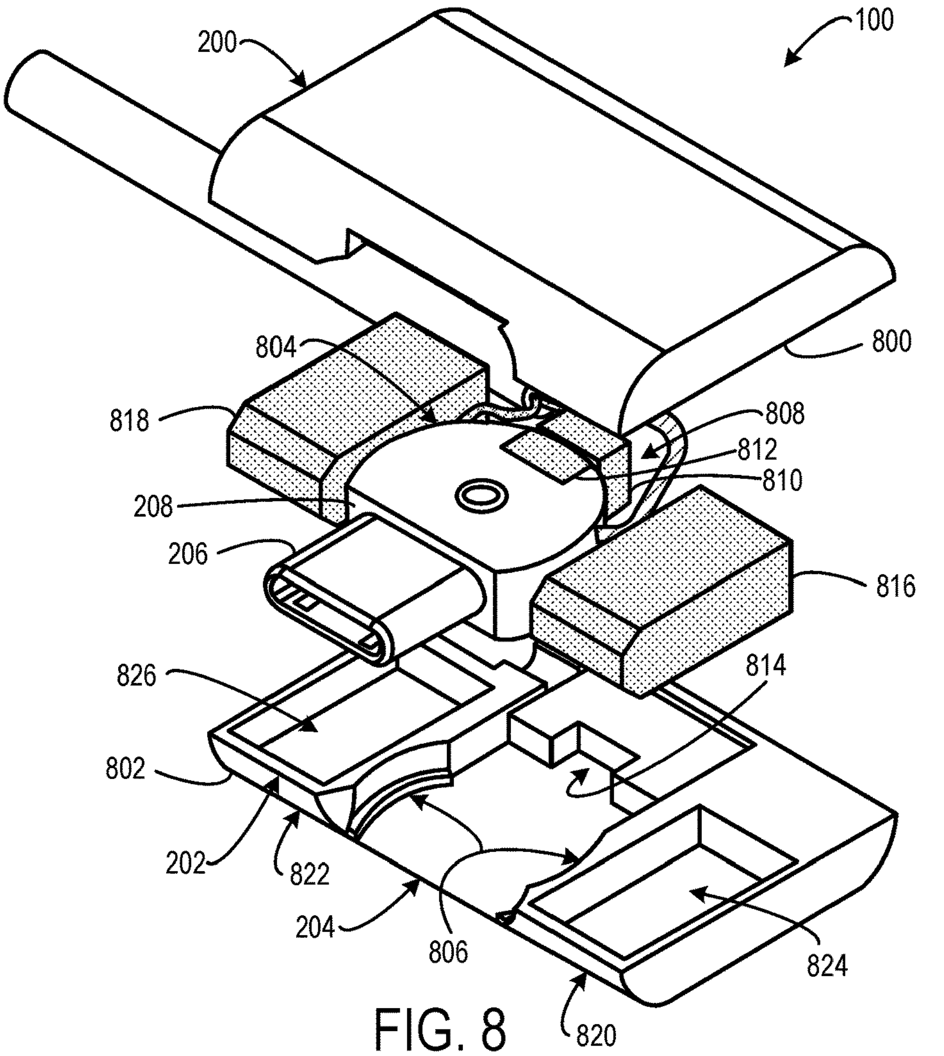
FIG. 8 shows an exploded view of an example pivotable connector.

FIG. 8 shows an exploded view of the pivotable connector 100. The housing 200 of the pivotable connector 100 includes a top part 800 and a bottom part 802 that couple together to enclose components of the pivotable connector 100 within the housing 200.

The internal retention structure 208 is at least partially contained within the housing 200. The internal retention structure 208 is coupled to the electronic plug 206 and configured to pivotably couple the electronic plug 206 to the housing 200, such that the electronic plug 206 has a range of angular adjustment relative to the leading surface 202 of the housing 200. In the illustrated example, the internal retention structure 208 forms a partially circular disk 804 that is pivotable relative to the housing 200 to pivot the electronic plug 206 within the range of angular adjustment. Arced interior sidewalls 806 formed in the bottom part 802 of the housing 200 retain the partially circular disk 804 in place within the housing 200 while allowing the partially circular disk 804 to pivot the electronic plug 206 within the range of angular adjustment. In other examples, different pivoting mechanisms may be used. The internal retention structure 208 provides the technical benefit of allowing the electronic plug 206 to angularly adjust or pivot relative to the housing 200 thus allowing the electronic plug to be removed from a plug receptacle with less force than another connector that has an electronic plug with a fixed orientation relative to a housing of the connector.

The pivotable connector 100 includes a bias mechanism 808 biasing the electronic plug 206 to a default position within the range of angular adjustment (e.g., the default position 504 shown in FIG. 5). In the illustrated example, the bias mechanism 808 includes a first bias magnet 810 fixed within the housing 200 and a second bias magnet 812 operatively coupled to the partially circular disk 804. The first bias magnet 810 is held in place by a cutout 814 formed in the bottom part 802 of the housing 200. The second bias magnet 812 is inset in the partially circular disk 804, such that the second bias magnet 812 pivots relative to the first bias magnet 810 as the partially circular disk 804 pivots. In this example, the electronic plug 206 is biased to the default position within the range of angular adjustment based at least on a magnetic attraction between the first bias magnet 810 and the second bias magnet 812. By having one bias magnet coupled to the partially circular disk 804 and the other bias magnet fixed to the housing, the bias magnets are rotatable relative to one another based at least on pivoting of the partially circular disk 804. Such a rotation relationship between the bias magnets provides the technical benefit of allowing the electronic plug 206 to be angularly adjusted relative to the housing 200 while also biasing the electronic plug 206 back to a default position.

The first and second bias magnets 810, 812 are selected to have a strength of magnetic attraction that allows for the partially circular disk 804 to pivot the electronic plug 206 through the entire range of angular adjustment while also allowing for the electronic plug 206 to return to the default position. In some examples, magnetic attraction between one permanent magnet and one magnetically compatible structure, such as a ferromagnetic structure such as iron, may be used instead of two permanent magnets.

The pivotable connector 100 includes a first connecting magnet 816 and a second connecting magnet 818. The first connecting magnet 816 is positioned within the housing 200 on a first side 820 of the plug opening 204. The second connecting magnet 818 is contained within the housing 200 on a second side 822 of the plug opening 204 that opposes the first side 820. The first connecting magnet 816 is held in place by a cutout 824 formed in the bottom part 802 of the housing 200. The second connecting magnet 818 is held in place by a cutout 826 formed in the bottom part 802 of the housing 200.

The pivotable connector 100 is removably affixable to an electronic device based at least on a magnetic attraction between the first and second connecting magnets 816, 818 and the electronic device. In some examples, the first and second connecting magnets 816, 818 are magnetically attracted to corresponding connecting magnets of the electronic device. In some examples, the first and second connecting magnets 816, 818 are magnetically attracted to ferromagnetic material of the electronic device, such as steel. The magnetic attraction provided by the first and second connecting magnets 816, 818 provides the technical benefit of allowing for various retention features to be omitted from the electronic plug 206, such that the electronic plug 206 has low friction engagement with a plug receptacle that allows for easy removal of the electronic plug 206 from the plug receptacle.

Although not shown, the top part 800 of the housing 200 may also include features to affix the partially circular disk 804, the first bias magnet 810, and the first and second connecting magnets 816, 818 in place within the housing 200. In some examples, the top part 800 of the housing 200 includes arced interior sidewalls that correspond to the arced interior sidewalls 806 formed in the bottom part 802 of the housing to rotatably couple the partially circular disk 804 to the housing 200. In some examples, the top part 800 of the housing 200 includes cutouts that correspond to the cutouts 824, 826 to affix the first and second connecting magnets 816, 818 in place within the housing 200. However, it should be noted that connector 100 is a non-limiting example and various other configurations that allow for angular adjustment of the plug fall within the scope of this disclosure.

Figure 9:
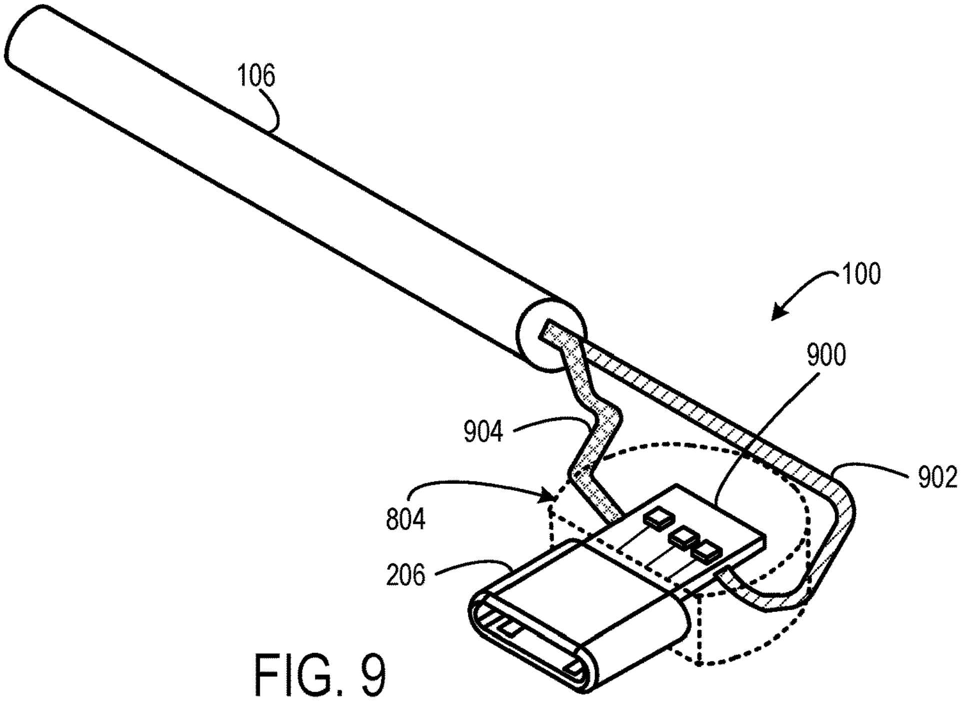
FIG. 9 shows aspects of an electronic plug and printed circuit board of the pivotable connector shown in FIG. 8.

FIG. 9 shows a view inside the partially circular disk 804 of the pivotable connector 100. The pivotable connector 100 includes a printed circuit board 900 mechanically coupled and electrically connected to the electronic plug 206. Positive (+) and negative (−) flexible power wires 902, 904 are electrically connected to the printed circuit board 900. The positive and negative flexible power wires 902, 904 are electrically connected through the cable 106 to an external power source. The positive and negative flexible power wires 902, 904 extend from the cable 106 and pass through the partially circular disk 804 to electrically connect to the printed circuit board 900. The positive and negative flexible power wires 902, 904 transfer electrical power to the electronic plug 206 via the printed circuit board 900. The printed circuit board 900 is encased in the partially circular disk 804, such that the printed circuit board 900 pivots relative to the housing 200 as the electronic plug 206 and the partially circular disk 804 pivot relative to the housing 200. Encasing the printed circuit board 900 in the partially circular disk 804 provides the technical benefit of making more space on the printed circuit board 900 available for various electronic components and/or electrical connections to be placed on the printed circuit board 900. The positive and negative flexible power wires 902, 904 bend to maintain electrical connections with the printed circuit board 900 as the printed circuit board 900 pivots with the partially circular disk 804.

In some implementations, the pivotable connector 100 may include additional data wires that extend from the cable 106 and electrically connect to the printed circuit board 900 to facilitate data transfer between the electronic plug 206 and an electronic device.

Figure 10:
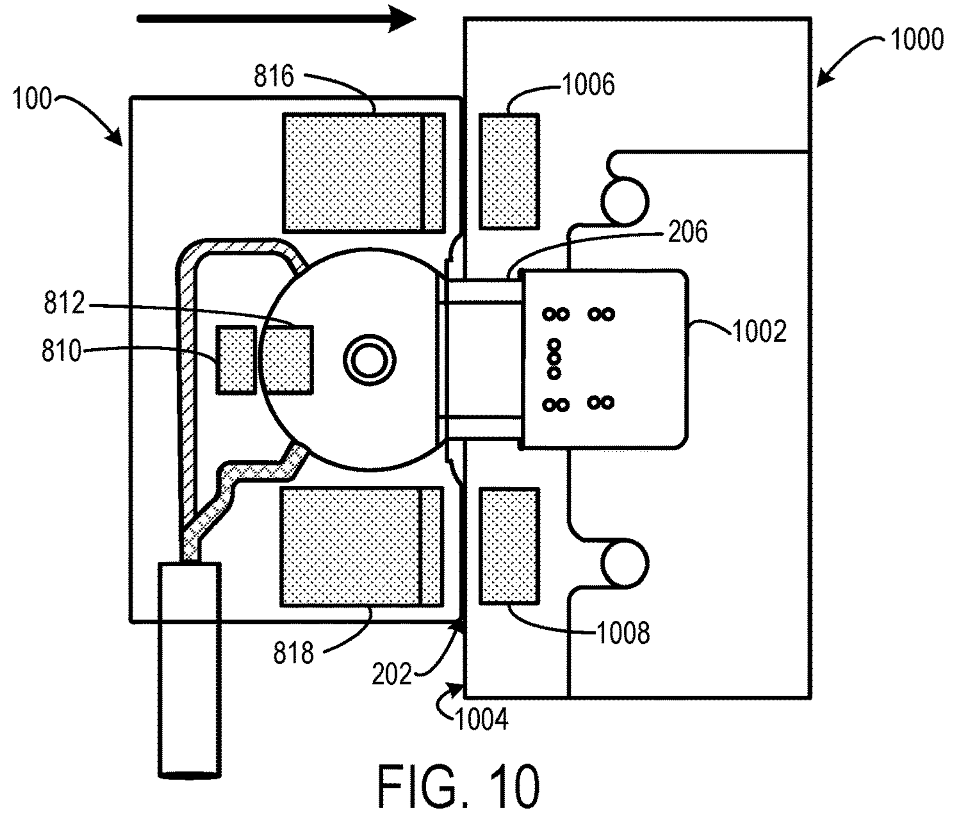
FIGS. 10-12 show interaction between an example pivotable connector including a magnetic bias mechanism and an electronic device.
Figure 11:
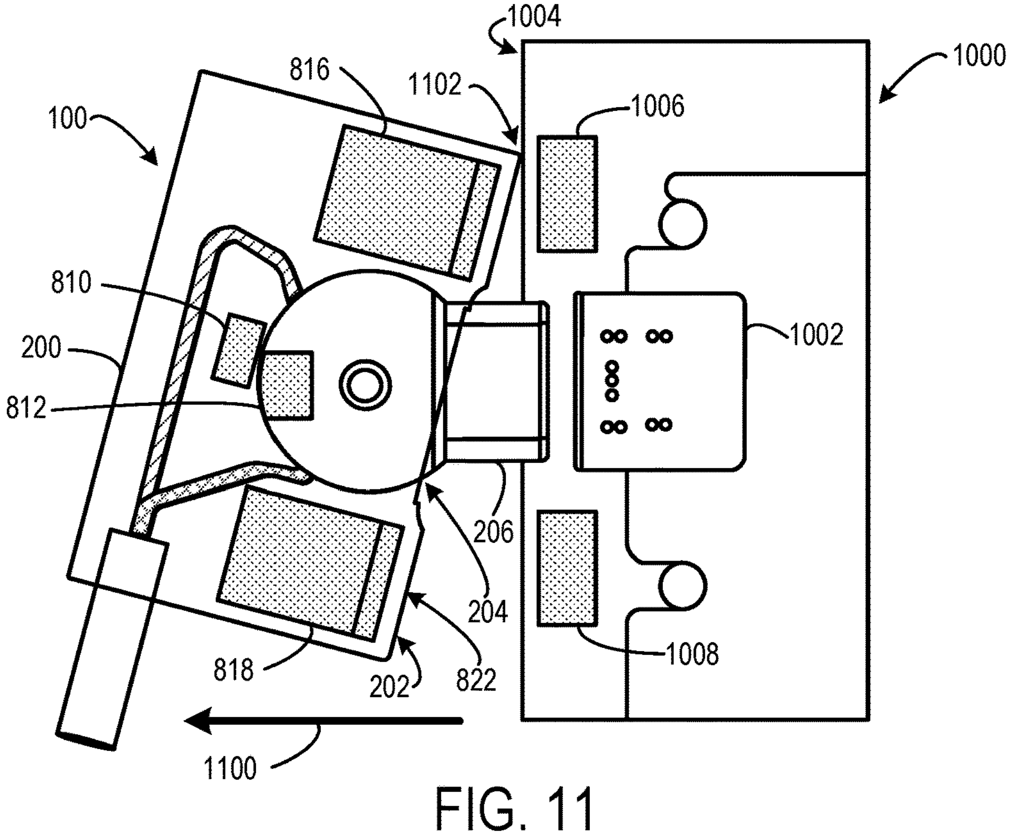
Figure 12:
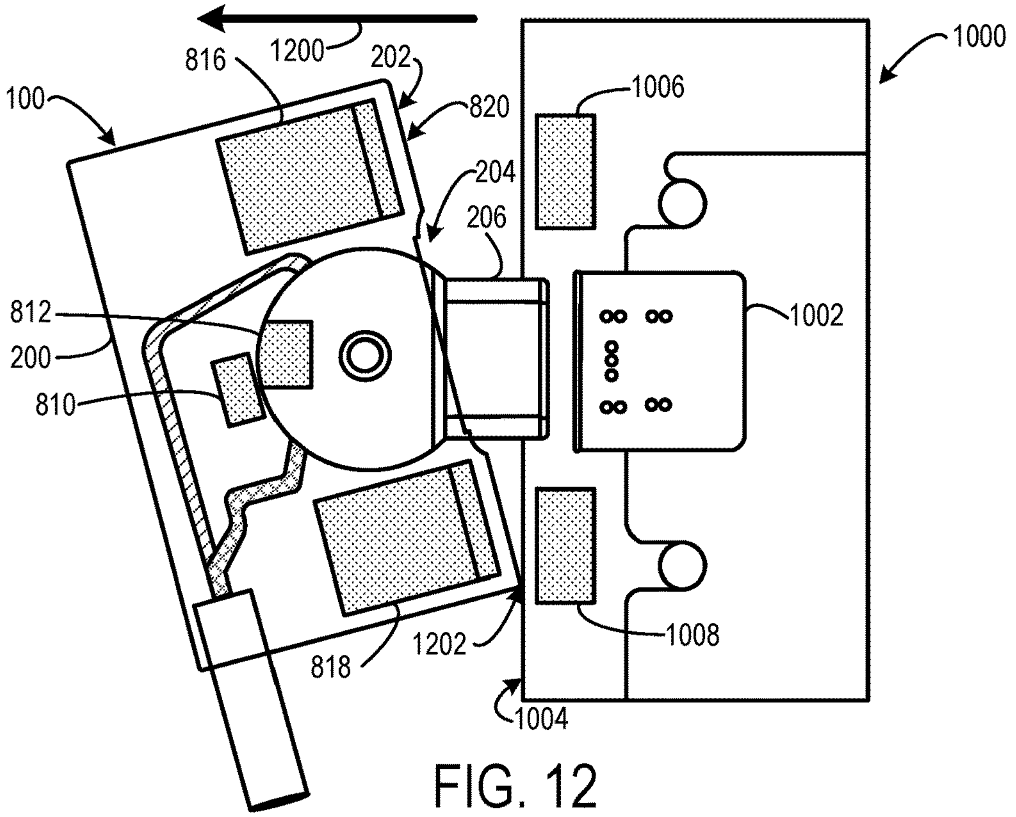

FIGS. 10-12 show interaction between the pivotable connector 100 and an electronic device 1000. In one example, the electronic device 1000 corresponds to the laptop computer 102 shown in FIG. 1. In FIG. 10, the pivotable connector 100 is aligned with a plug receptacle 1002 of the electronic device 1000 and the electronic plug 206 is in the default position to allow the electronic plug 206 to be inserted into the plug receptacle 1002. The electronic plug 206 is biased to the default position based at least on a magnetic attraction between the first and second bias magnets 810, 812. In this plugged-in state, the leading surface 202 of the pivotable connector 100 interfaces with a corresponding surface 1004 of the electronic device 1000. The first and second connecting magnets 816, 818 are magnetically attracted to corresponding first and second retention magnets 1006, 1008 of the electronic device 1000. Such magnetic attraction contributes to removably affixing the pivotable connector 100 to the electronic device 1000. In some examples, the first and second retention magnets 1006, 1008 are omitted from the electronic device 1000, and the first and second connecting magnets 816, 818 are magnetically attracted to ferromagnetic material of the electronic device 600, such as a steel frame, to removably affix the pivotable connector 100 to the electronic device 1000.

FIG. 11 shows an example scenario in which the lower side 822 of the pivotable connector 100 is pulled away from the electronic device 1000 with an off-axis force 1100. A fulcrum 1102 of the pivotable connector 100 is spaced away from the plug opening 204 on a top corner of the leading surface 202. The fulcrum 1102 is leveraged against the surface 1004 of the electronic device 1000 by the off-axis force 1100. The off-axis force 1100 is strong enough to overcome the magnetic attraction between the first and second connecting magnets 816, 818 and the first and second retention magnets 1006, 1008 to pull the electronic plug 206 out of the plug receptacle 1002. Further, the off-axis force 1100 is strong enough to overcome the magnetic attraction between the first and second bias magnets 810, 812. As the housing 200 pivots relative to the electronic device 1000, the electronic plug 206 pivots relative to the housing 200 while the fulcrum 1102 moves down. As such, the electronic plug 206 maintains alignment with the plug receptacle 1002. Such alignment reduces friction and binding between the electronic plug 206 and the plug receptacle 1002 that allows for easy removal of the electronic plug 206 from the plug receptacle 1002 even though the off-axis force 1100 is used to pull the electronic plug 206 out of the plug receptacle 1002.

FIG. 12 shows an example scenario in which the upper side 820 of the pivotable connector 100 is pulled away from the electronic device 1000 with an off-axis force 1200. A fulcrum 1202 of the pivotable connector 100 is spaced away from the plug opening 204 on a bottom corner of the leading surface 202. The fulcrum 1202 is leveraged against the surface 1004 of the electronic device 1000 by the off-axis force 1200. The off-axis force 1200 is strong enough to overcome the magnetic attraction between the first and second connecting magnets 816, 818 and the first and second retention magnets 1006, 1008 (and/or ferromagnetic material) to pull the electronic plug 206 out of the plug receptacle 1002. Further, the off-axis force 1200 is strong enough to overcome the magnetic attraction between the first and second bias magnets 810, 812. As the housing 200 pivots relative to the electronic device 1000, the electronic plug 206 pivots relative to the housing 200 while the fulcrum 1202 moves up. As such, the electronic plug 206 maintains alignment with the plug receptacle 1002. Such alignment reduces friction and binding between the electronic plug 206 and the plug receptacle 1002 that allows for easy removal of the electronic plug 206 from the plug receptacle 1002 even though the off-axis force 1200 is used to pull the electronic plug 206 out of the plug receptacle 1002.

Figure 13:
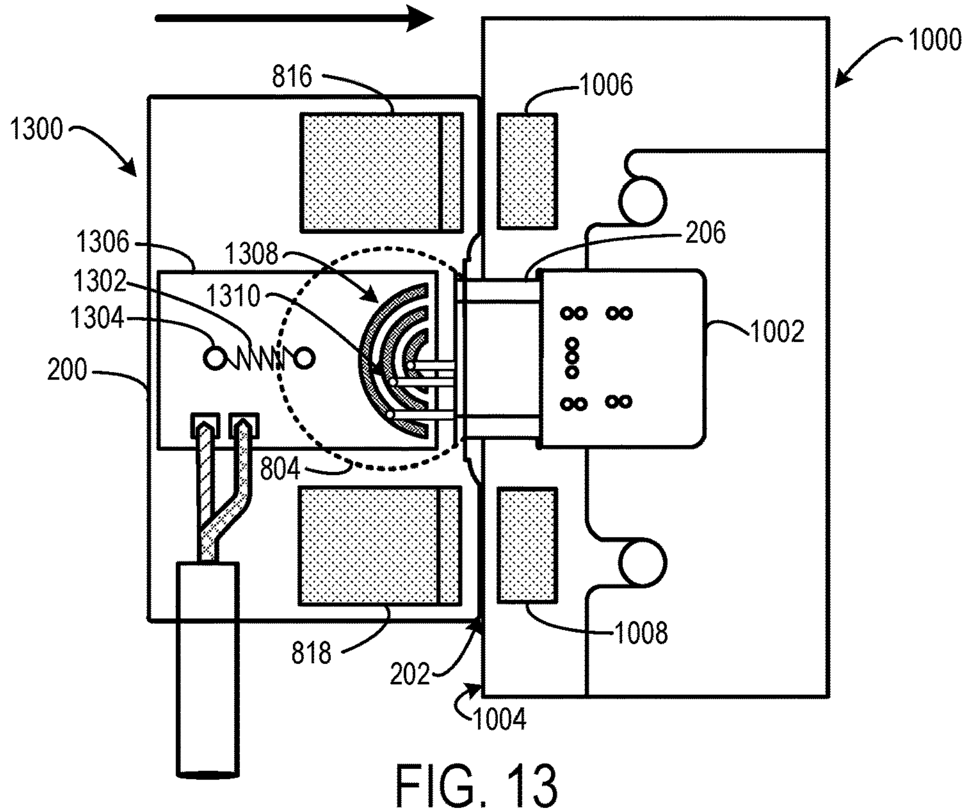
FIGS. 13-15 show interaction between an example pivotable connector including a spring bias mechanism and an electronic device.
Figure 14:
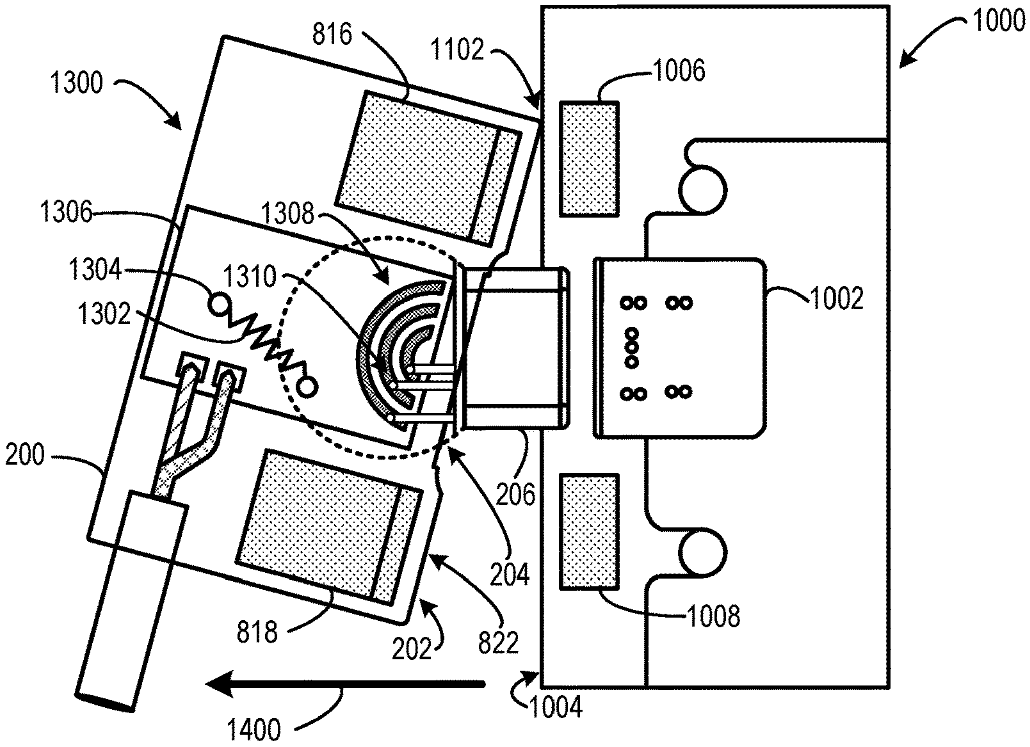
Figure 15:
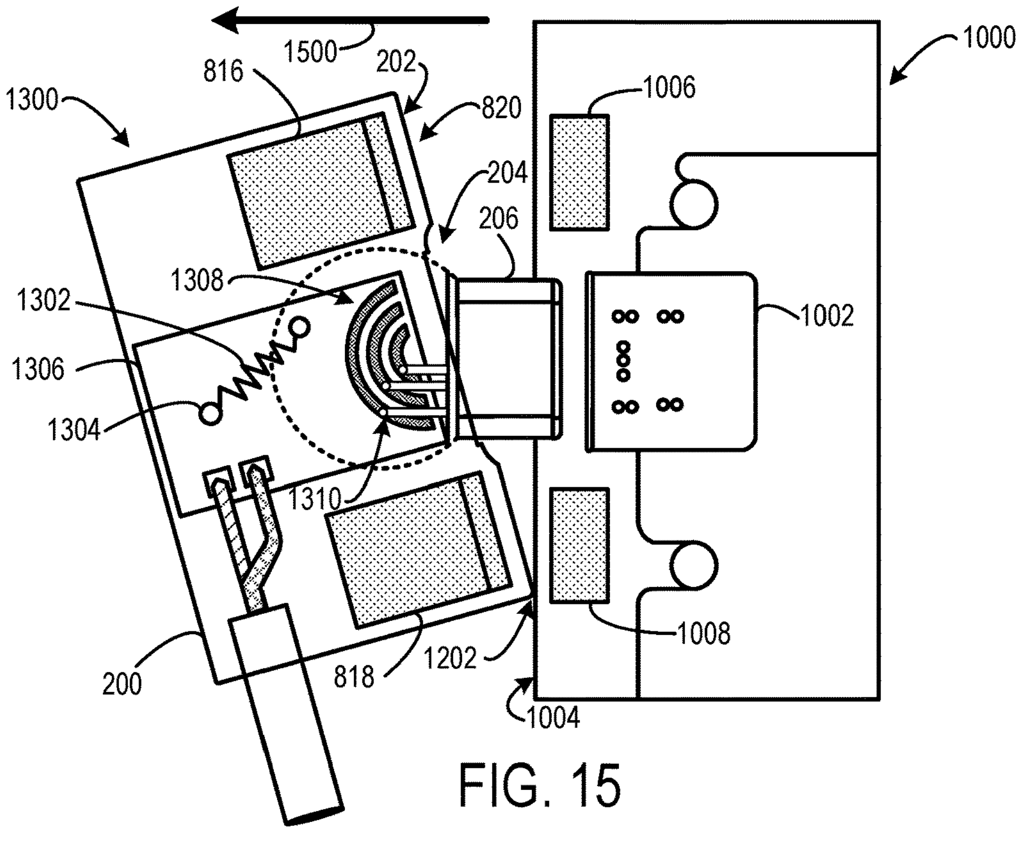

In some implementations, a pivotable connector includes a spring bias mechanism that biases an electronic plug to a default position within a range of angular adjustment. A spring may provide a less expensive alternative to a magnetic biasing solution. FIGS. 13-15 show interaction between a pivotable connector 1300 including a spring bias mechanism and an electronic device. Features of the pivotable connector 1300 that are common with the pivotable connector 100 shown in FIGS. 1-12 are identified in the same way and are described no further. The pivotable connector 1300 includes a spring 1302 operatively coupled between a fixed position 1304 in the housing 200 and the partially circular disk 804 to bias the electronic plug 206 to a default position.

In the illustrated implementation, the pivotable connector 1300 includes a printed circuit board 1306 that is fixed within the housing 200. The printed circuit board 1306 is not encased in the partially circular disk 804 so that the partially circular disk 804 and the electronic plug 206 can pivot relative to the printed circuit board 1306. Note that the partially circular disk 804 is shown in dashed lines in FIGS. 13-15 to reveal the electrical interface between the printed circuit board and the electronic plug 206. The printed circuit board 1306 includes a plurality of arced contact pads 1308. Further, the electronic plug 206 includes a plurality of pins 1310 that maintain contact with the arced contact pads 1308 as the electronic plug 206 pivots through the range of angular adjustment.

In FIG. 13, the pivotable connector 1300 is aligned with the plug receptacle 1002 of the electronic device 1000 and the electronic plug 206 is in the default position to allow the electronic plug 206 to be inserted into the plug receptacle 1002. The electronic plug 206 is biased to the default position based at least on a spring force of the spring 1302. In this plugged-in state, the leading surface 202 of the pivotable connector 1300 interfaces with the corresponding surface 1004 of the electronic device 1000. The first and second connecting magnets 816, 818 are magnetically attracted to the corresponding first and second retention magnets 1006, 1008 (and/or ferromagnetic material) of the electronic device 1000. Such magnetic attraction contributes to removably affixing the pivotable connector 100 to the electronic device 1000.

FIG. 14 shows an example scenario in which the lower side 822 of the pivotable connector 1300 is pulled away from the electronic device 1000 with an off-axis force 1400. A fulcrum 1102 of the pivotable connector 1300 is spaced away from the plug opening 204 on a top corner of the leading surface 202. The fulcrum 1102 is leveraged against the surface 1004 of the electronic device 1000 by the off-axis force 1400. The off-axis force 1400 is strong enough to overcome the magnetic attraction between the first and second connecting magnets 816, 818 and the first and second retention magnets 1006, 1008 (and/or ferromagnetic material) to pull the electronic plug 206 out of the plug receptacle 1002. Further, the off-axis force 1400 is strong enough to overcome the spring force of the spring 1302 to allow the electronic plug 206 to pivot relative to the housing 200. As the housing 200 pivots relative to the electronic device 1000, the electronic plug 206 pivots relative to the housing 200 while the fulcrum 1102 moves down. As such, the electronic plug 206 maintains alignment with the plug receptacle 1002. Such alignment reduces friction and binding between the electronic plug 206 and the plug receptacle 1002 that allows for easy removal of the electronic plug 206 from the plug receptacle 1002 even though the off-axis force 1400 is used to pull the electronic plug 206 out of the plug receptacle 1002. Further, as the printed circuit board 1306 pivots with the housing 200, the plurality of pins 1310 maintain contact with the arced contact pads 1308 such that the electronic plug 206 remains electrically connected to the printed circuit board 1306.

FIG. 15 shows an example scenario in which the upper side 820 of the pivotable connector 1300 is pulled away from the electronic device 1000 with an off-axis force 1500. A fulcrum 1202 of the pivotable connector 1300 is spaced away from the plug opening 204 on a bottom corner of the leading surface 202. The fulcrum 1202 is leveraged against the surface 1004 of the electronic device 1000 by the off-axis force 1500. The off-axis force 1500 is strong enough to overcome the magnetic attraction between the first and second connecting magnets 816, 818 and the first and second retention magnets 1006, 1008 (and/or ferromagnetic material) to pull the electronic plug 206 out of the plug receptacle 1002. Further, the off-axis force 1500 is strong enough to overcome the spring force of the spring 1302 to allow the electronic plug 206 to pivot relative to the housing 200. As the housing 200 pivots relative to the electronic device 1000, the electronic plug 206 pivots relative to the housing 200 while the fulcrum 1202 moves up. As such, the electronic plug 206 maintains alignment with the plug receptacle 1002. Such alignment reduces friction and binding between the electronic plug 206 and the plug receptacle 1002 that allows for easy removal of the electronic plug 206 from the plug receptacle 1002 even though the off-axis force 1200 is used to pull the electronic plug 206 out of the plug receptacle 1002. Further, as the printed circuit board 1306 pivots with the housing 200, the plurality of pins 1310 maintain contact with the arced contact pads 1308 such that the electronic plug 206 remains electrically connected to the printed circuit board 1306.

In some implementations, a pivotable connector includes a low-friction electronic plug that includes features that reduce friction between the low-friction electronic plug and a corresponding plug receptacle of an electronic device when the electronic plug is inserted into or removed from the plug receptacle.

Figure 16:
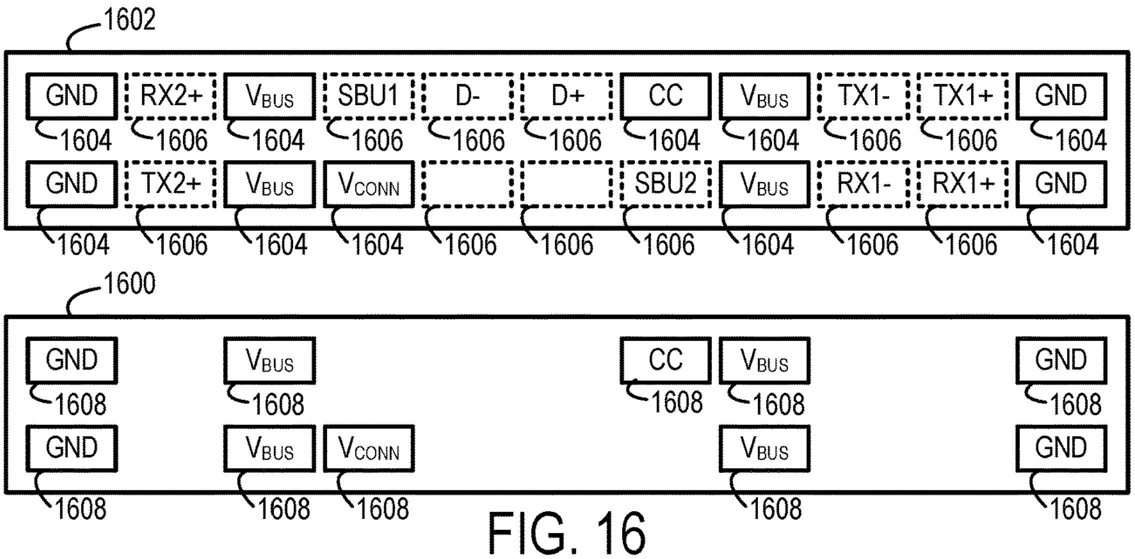
FIG. 16 shows pin layouts of an electronic plug of an example pivotable connector and an example plug receptacle.

In some examples, a low-friction electronic plug includes a number of pins (N) that is less than a number of pin contacts (M) of a pin receptacle. Note that the numbers N and M may be any suitable numbers as long as N is less than M. FIG. 16 shows example pin layouts of a low-friction electronic plug 1600 of a pivotable connector and a plug receptacle 1602 of an electronic device. For example, the low-friction electronic plug 1600 is representative of the electronic plug 206 of the pivotable connector 100 shown in FIGS. 1-12 or the pivotable connector 1300 shown in FIGS. 13-15. The low-friction electronic plug 1600 includes a set of power pins 1608 configured to facilitate a transfer of electrical power through the low-friction electronic plug 1600 to the electronic device. In this example, the set of power pins 1608 includes 10 power pins, so in this example N equals 10.

In this example, the pin layout of the plug receptacle 1602 is that of a USB-C type plug receptacle. The plug receptacle 1602 includes a set of power pin contacts 1604 and a set of data pin contacts 1606. The set of power pin contacts 1604 include 10 pin contacts. The set of data pin contacts 1606 include 14 pin contacts. In this example M equals 24, and pin contacts that do not correspond to the set of power pins are data pin contacts. The set of power pin contacts 1604 interface with the set of power pins 1608 of the low-friction electronic plug 1600 to facilitate the transfer of electrical power to the electronic device. The set of data pin contacts 1606 facilitate the transmission and reception of data. However, in this example, the low-friction electronic plug 1600 lacks any data pins and thus does not have data transmission/reception functionality. Instead, the low-friction electronic plug 1600 provides electrical power transmission functionality.

When a pin interfaces with a pin contact friction is generated. By having less pins in the low-friction electronic plug than pin contacts in the plug receptacle, the low the amount of friction generated from the low-friction electronic plug being inserted into the plug receptacle is reduced relative to an electronic plug that has a greater number of pins interfacing with pin contacts of the plug receptacle. Such a reduction in friction provides the technical benefit of allowing for the low-friction electronic plug to be more easily inserted into the plug receptacle with less force. Further, such a reduction in friction allows for the low-friction electronic plug to be more easily removed from the plug receptacle.

In other examples, a pivotable connector includes both power pins and data pins to provide both electrical power and data transmission functionality at the cost of having higher friction engagement between the electronic plug and the plug receptacle.

Figure 17:
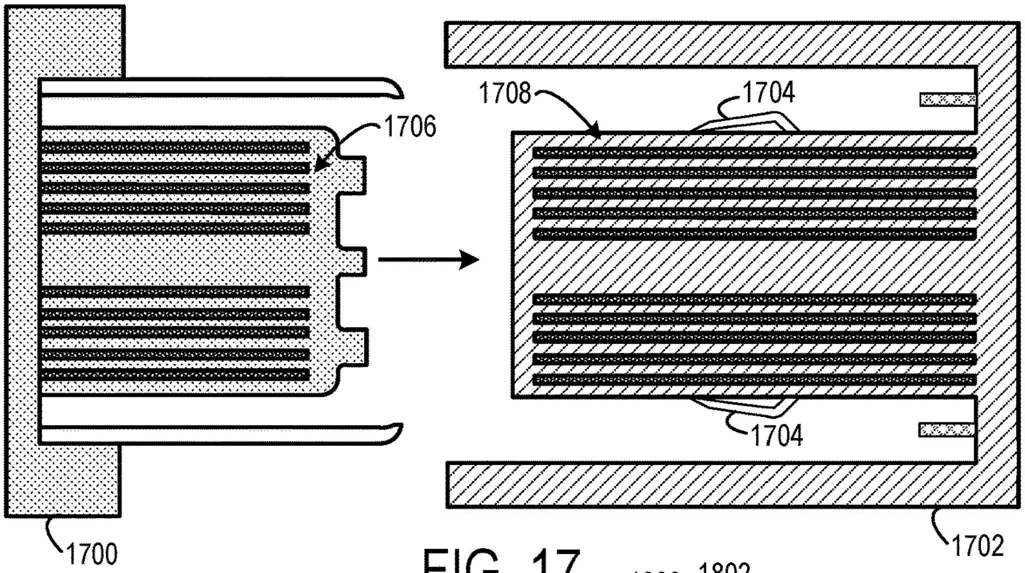
FIGS. 17 and 18 show low-friction features of an electronic plug of an example pivotable connector.
Figure 18:
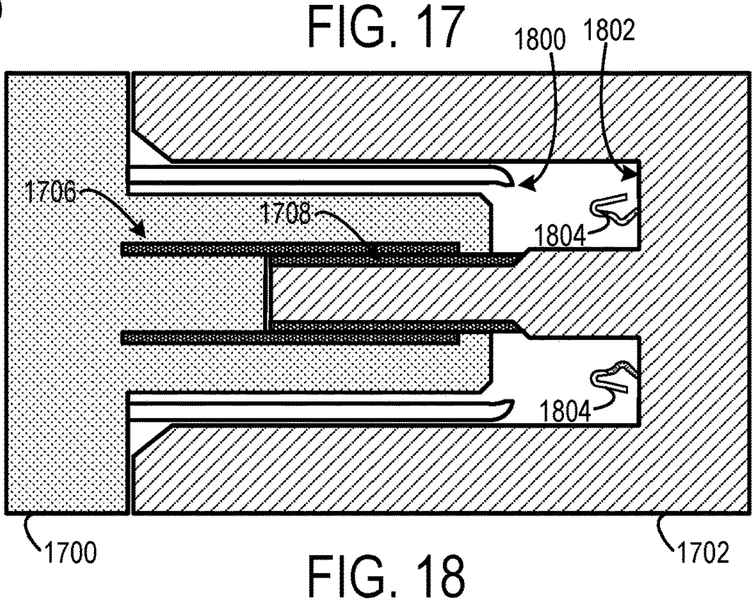

FIGS. 17 and 18 show additional low-friction features of a low-friction electronic plug 1700 of a pivotable connector. FIG. 17 is a top view of the low-friction electronic plug 1700 and a plug receptacle 1702. FIG. 18 is a side view of the low-friction electronic plug 1700 and the plug receptacle 1702. For example, the low-friction electronic plug 1700 is representative of the electronic plug 206 of the pivotable connector 100 shown in FIGS. 1-12 or the pivotable connector 1300 shown in FIGS. 13-15.

As shown in FIG. 17, in some examples, the plug receptacle 1702 includes a pair of retention detents 1704 that engage with a corresponding pair of retention latches of a high-friction electronic plug of a connector to retain the electronic plug in the plug receptacle 1702. However, the low-friction electronic plug 1700 lacks a pair of retention latches and instead the magnetic attraction between the connecting magnets 816, 818 (shown in FIGS. 10 and 13) and the corresponding retention magnets 1006, 1008 (shown in FIGS. 10 and 13) and/or ferromagnetic material of the electronic device is used to help secure the low-friction electronic plug 1700 in the plug receptacle 1702. In particular, when the low-friction electronic plug 1700 is inserted into the plug receptacle 1702, the low-friction electronic plug 1700 passes over the retention detents 1704 without engaging the retention detents 1704. When the low-friction electronic plug 1700 is inserted into the plug receptacle 1702, a plurality of pins 1706 of the low-friction electronic plug 1700 engage with a corresponding plurality of pin contacts 1708 of the plug receptacle 1702.

By not engaging the retention detents, the low-friction electronic plug 1700 provides the technical benefit of reducing the amount of friction generated from the low-friction electronic plug 1700 being inserted into the plug receptacle relative to an electronic plug that includes retention latches that engage with the retention detents 1704. Such a reduction in friction allows for the low-friction electronic plug 1700 to be more easily inserted into the plug receptacle 1702. Further, such a reduction in friction allows for the low-friction electronic plug 1700 to be more easily removed from the plug receptacle 1702.

As shown in FIG. 18, in some examples, the low-friction electronic plug 1700 has a shortened length (e.g., relative to a conventional USB-C type plug), such that a leading edge 1800 of the low-friction electronic plug 1700 does not extend to a backend 1802 of the plug receptacle 1702. In some examples, the plug receptacle 1702 includes a pair of ground pins 1804 positioned at the backend 1802 of the plug receptacle 1702. The low-friction electronic plug 1700 has a length short enough that the low-friction electronic plug 1700 does not electrically connect with the ground pins 1804 upon the low-friction electronic plug 1700 being inserted into the plug receptacle 1702. The ground pins 1804 reduce electromagnetic interference (EMI) noise of signals during data transmission between data pins and data pin contacts. Since the low-friction electronic plug 1700 does not have data transmission functionality, the low-friction electronic plug 1700 does not need to be electrically connected to the ground pins 1804.

Note that the low-friction electronic plug 1700 is long enough that when inserted into the plug receptacle 1702, the plurality of pins 1706 of the low-friction electronic plug 1700 engage with the corresponding plurality of pin contacts 1708 of the plug receptacle 1702.

By not engaging the ground pins 1804, the low-friction electronic plug 1700 provides the technical benefit of reducing the amount of friction generated from the low-friction electronic plug being inserted into the plug receptacle relative to an electronic plug that is long enough to engage the ground pins 1804. Such a reduction in friction allows for the low-friction electronic plug 1700 to be more easily inserted into the plug receptacle 1702. Further, such a reduction in friction allows for the low-friction electronic plug 1700 to be more easily removed from the plug receptacle 1702. Furthermore, a shortened plug reduces the angular extent to which the plug must pivot before fully clearing the plug receptacle. Shortening the low-friction electronic plug 1700 also allows the connector housing leading edge 202 to contact the electronic device surface 1004 bringing the connecting magnets 816 and 818 closer to device side retention magnets 1006, 1008 (and/or ferromagnetic material) thus increasing the retention force between the pivotable connector 100 and the electronic device 1000.

In some examples, a pivotable connector may include any combination of the above described low-friction features to provide low friction engagement between a low-friction electronic plug and a plug receptacle. Moreover, each of the above-described features provide the technical benefit of reducing or eliminating undesirably pulling/moving the electronic device responsive to pulling on the connector's power cord and/or reducing degradation of the pivotable connector upon repeated insertion and removal of the electronic plug into/out of various plug receptacles.

In an example, a connector comprises a housing including a leading surface including a plug opening and a fulcrum spaced away from the plug opening, an electronic plug extending through the plug opening away from the leading surface of the housing, a pivot providing the electronic plug a range of angular adjustment relative to the leading surface of the housing, and a bias mechanism biasing the electronic plug to a default position within the range of angular adjustment. In this example and/or other examples, the fulcrum may be a first fulcrum, and the leading surface of the housing may include a second fulcrum spaced away from the plug opening on an opposing side of the plug opening from the first fulcrum, such that the plug opening is positioned between the first fulcrum and the second fulcrum. In this example and/or other examples, the connector may further comprise a connecting magnet contained within the housing, the connector may be removably affixable to an electronic device based at least on a magnetic attraction between the connecting magnet and the electronic device. In this example and/or other examples, the connecting magnet may be a first connecting magnet positioned within the housing on a first side of the plug opening, the connector may further comprises a second connecting magnet contained within the housing on a second side of the plug opening that opposes the first side, and the connector may be removably affixable to the electronic device based at least on a magnetic attraction between the first and second connecting magnets and the electronic device. In this example and/or other examples, the connector may be configured to electrically connect to the electronic device via insertion of the electronic plug into a plug receptacle of the electronic device, the electronic plug may include a number of pins (N) that is less than a number of pin contacts (M) of the plug receptacle. In this example and/or other examples, the number of pins (N) may correspond to a set of power pins configured to facilitate a transfer of electrical power through the connector to the electronic device, and pin contacts of the number of pin contacts (M) that do not correspond to the set of power pins may be data pin contacts. In this example and/or other examples, the plug receptacle may include a pair of retention detents configured to engage with a corresponding pair of retention latches of a high-friction electronic plug, and the electronic plug may be a low-friction electronic plug that lacks a pair of retention latches. In this example and/or other examples, the plug receptacle may include a ground pin positioned at a backend of the plug receptacle, and the electronic plug may be a low-friction electronic plug having a shortened length, such that the low-friction electronic plug does not electrically connect with the ground pin upon the low-friction electronic plug being inserted into the plug receptacle. In this example and/or other examples, the connector may further comprise an internal retention structure at least partially contained within the housing and configured to pivotably couple the electronic plug to the housing. In this example and/or other examples, the internal retention structure may form a partially circular disk pivotable relative to the housing to pivot the electronic plug within the range of angular adjustment. In this example and/or other examples, the bias mechanism may include a first bias magnet fixed within the housing and a second bias magnet that pivots with the electronic plug, and the electronic plug may be biased to the default position within the range of angular adjustment based at least on a magnetic attraction between the first bias magnet and the second bias magnet. In this example and/or other examples, the bias mechanism may include a spring operatively coupled to a fixed position in the housing to bias the electronic plug to the default position. In this example and/or other examples, the connector may further comprise a printed circuit board mechanically coupled and electrically connected to the electronic plug, and a flexible power wire electrically connected to the printed circuit board to transfer electrical power to the electronic plug via the printed circuit board, the printed circuit board may pivot relative to the housing as the electronic plug pivots, and the electrical power wire may bend to maintain an electrical connection with the printed circuit board as the printed circuit board pivots.

In another example, a connector comprises a housing including a leading surface including a plug opening and a fulcrum spaced away from the plug opening, an electronic plug extending through the plug opening away from the leading surface of the housing, a biased pivot providing the electronic plug a range of angular adjustment relative to the leading surface of the housing, and a connecting magnet contained within the housing, wherein the connector is removably affixable to an electronic device based at least on a magnetic attraction between the connecting magnet and the electronic device. In this example and/or other examples, the fulcrum may be a first fulcrum, and the leading surface of the housing may include a second fulcrum spaced away from the plug opening on an opposing side of the plug opening from the first fulcrum, such that the plug opening is positioned between the first fulcrum and the second fulcrum. In this example and/or other examples, the connector may further comprise an internal retention structure at least partially contained within the housing and configured to pivotably couple the electronic plug to the housing, the biased pivot may be biased by a bias mechanism including a first bias magnet fixed within the housing and a second bias magnet operatively coupled to the internal retention structure, and the electronic plug may be biased to a default position within the range of angular adjustment based at least on a magnetic attraction between the first bias magnet and the second bias magnet. In this example and/or other examples, the connector may further comprise a printed circuit board mechanically coupled and electrically connected to the electronic plug, and a flexible power wire electrically connected to the printed circuit board to transfer electrical power to the electronic plug via the printed circuit board, the printed circuit board may pivot relative to the housing as the electronic plug pivots, and the electrical power wire may bend to maintain an electrical connection with the printed circuit board as the printed circuit board pivots.

In yet another example, a connector comprises a housing including a leading surface including a plug opening, an electronic plug extending through the plug opening away from the leading surface of the housing, a pivot providing the electronic plug a range of angular adjustment relative to the leading surface of the housing, and a bias mechanism including a first bias magnet fixed within the housing and a second bias magnet operatively coupled to the electronic plug, the bias mechanism biasing the electronic plug to a default position within the range of angular adjustment based at least on a magnetic attraction between the first bias magnet and the second bias magnet. In this example, and/or other examples, the connector may further comprise a connecting magnet contained within the housing, the connector is removably affixable to an electronic device based at least on a magnetic attraction between the connecting magnet and the electronic device. In this example, and/or other examples, the connector may further comprise a printed circuit board mechanically coupled and electrically connected to the electronic plug, and a flexible power wire electrically connected to the printed circuit board to transfer electrical power to the electronic plug via the printed circuit board, the printed circuit board may pivot relative to the housing as the electronic plug pivots, and the electrical power wire may bend to maintain an electrical connection with the printed circuit board as the printed circuit board pivots.

It will be understood that the configurations and/or approaches described herein are exemplary in nature, and that these specific implementations or examples are not to be considered in a limiting sense, because numerous variations are possible. The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A connector comprising:

a housing including a leading surface including a plug opening and a fulcrum spaced away from the plug opening;

an electronic plug extending through the plug opening away from the leading surface of the housing;

a pivot providing the electronic plug a range of angular adjustment relative to the leading surface of the housing; and a bias mechanism biasing the electronic plug to a default position within the range of angular adjustment.

2. The connector of claim 1, wherein the fulcrum is a first fulcrum, and wherein the leading surface of the housing includes a second fulcrum spaced away from the plug opening on an opposing side of the plug opening from the first fulcrum, such that the plug opening is positioned between the first fulcrum and the second fulcrum.

3. The connector of claim 1, further comprising a connecting magnet contained within the housing, wherein the connector is removably affixable to an electronic device based at least on a magnetic attraction between the connecting magnet and the electronic device.

4. The connector of claim 3, wherein the connecting magnet is a first connecting magnet positioned within the housing on a first side of the plug opening, wherein the connector further comprises a second connecting magnet contained within the housing on a second side of the plug opening that opposes the first side, and wherein the connector is removably affixable to the electronic device based at least on a magnetic attraction between the first and second connecting magnets and the electronic device.

5. The connector of claim 1, wherein the connector is configured to electrically connect to the electronic device via insertion of the electronic plug into a plug receptacle of the electronic device, wherein the electronic plug includes a number of pins (N) that is less than a number of pin contacts (M) of the plug receptacle.

6. The connector of claim 5, wherein the number of pins (N) correspond to a set of power pins configured to facilitate a transfer of electrical power through the connector to the electronic device, and wherein pin contacts of the number of pin contacts (M) that do not correspond to the set of power pins are data pin contacts.

7. The connector of claim 5, wherein the plug receptacle includes a pair of retention detents configured to engage with a corresponding pair of retention latches of a high-friction electronic plug, and wherein the electronic plug is a low-friction electronic plug that lacks a pair of retention latches.

8. The connector of claim 5, wherein the plug receptacle includes a ground pin positioned at a backend of the plug receptacle, and wherein the electronic plug is a low-friction electronic plug having a shortened length, such that the low-friction electronic plug does not electrically connect with the ground pin upon the low-friction electronic plug being inserted into the plug receptacle.

9. The connector of claim 1, further comprising an internal retention structure at least partially contained within the housing and configured to pivotably couple the electronic plug to the housing.

10. The connector of claim 9, wherein the internal retention structure forms a partially circular disk pivotable relative to the housing to pivot the electronic plug within the range of angular adjustment.

11. The connector of claim 1, wherein the bias mechanism includes a first bias magnet fixed within the housing and a second bias magnet that pivots with the electronic plug, and wherein the electronic plug is biased to the default position within the range of angular adjustment based at least on a magnetic attraction between the first bias magnet and the second bias magnet.

12. The connector of claim 1, wherein the bias mechanism includes a spring operatively coupled to a fixed position in the housing to bias the electronic plug to the default position.

13. The connector of claim 1, further comprising:

a printed circuit board mechanically coupled and electrically connected to the electronic plug; and a flexible power wire electrically connected to the printed circuit board to transfer electrical power to the electronic plug via the printed circuit board, wherein the printed circuit board pivots relative to the housing as the electronic plug pivots, and wherein the electrical power wire bends to maintain an electrical connection with the printed circuit board as the printed circuit board pivots.

14. A connector comprising:

a housing including a leading surface including a plug opening and a fulcrum spaced away from the plug opening;

an electronic plug extending through the plug opening away from the leading surface of the housing;

a biased pivot providing the electronic plug a range of angular adjustment relative to the leading surface of the housing; and a connecting magnet contained within the housing, wherein the connector is removably affixable to an electronic device based at least on a magnetic attraction between the connecting magnet and the electronic device.

15. The connector of claim 14, wherein the fulcrum is a first fulcrum, and wherein the leading surface of the housing includes a second fulcrum spaced away from the plug opening on an opposing side of the plug opening from the first fulcrum, such that the plug opening is positioned between the first fulcrum and the second fulcrum.

16. The connector of claim 14, further comprising an internal retention structure at least partially contained within the housing and configured to pivotably couple the electronic plug to the housing, wherein the biased pivot is biased by a bias mechanism including a first bias magnet fixed within the housing and a second bias magnet operatively coupled to the internal retention structure, and wherein the electronic plug is biased to a default position within the range of angular adjustment based at least on a magnetic attraction between the first bias magnet and the second bias magnet.

17. The connector of claim 14, further comprising:

a printed circuit board mechanically coupled and electrically connected to the electronic plug; and a flexible power wire electrically connected to the printed circuit board to transfer electrical power to the electronic plug via the printed circuit board, wherein the printed circuit board pivots relative to the housing as the electronic plug pivots, and wherein the electrical power wire bends to maintain an electrical connection with the printed circuit board as the printed circuit board pivots.

18. A connector comprising:

a housing including a leading surface including a plug opening;

an electronic plug extending through the plug opening away from the leading surface of the housing;

a pivot providing the electronic plug a range of angular adjustment relative to the leading surface of the housing; and a bias mechanism including a first bias magnet fixed within the housing and a second bias magnet operatively coupled to the electronic plug, the bias mechanism biasing the electronic plug to a default position within the range of angular adjustment based at least on a magnetic attraction between the first bias magnet and the second bias magnet.

19. The connector of claim 18, further comprising a connecting magnet within the housing, wherein the connector is removably affixable to an electronic device based at least on a magnetic attraction between the connecting magnet and the electronic device.

20. The connector of claim 18, further comprising:

a printed circuit board mechanically coupled and electrically connected to the electronic plug; and a flexible power wire electrically connected to the printed circuit board to transfer electrical power to the electronic plug via the printed circuit board, wherein the printed circuit board pivots relative to the housing as the electronic plug pivots, and wherein the electrical power wire bends to maintain an electrical connection with the printed circuit board as the printed circuit board pivots.

* * * * *